3,198,845
PROCESS FOR THE CONDENSATION OF AROMATIC COMPOUNDS WITH UNSATURATED HYDROCARBONS
Raymond A. Franz, Kirkwood, and Richard N. Moore, Creve Coeur, Mo., assignors to Monsanto Company, a corporation of Delaware
No Drawing. Filed Nov. 8, 1962, Ser. No. 236,433
10 Claims. (Cl. 260—668)

The present invention relates to a process for the production of substituted aromatic compounds by the condensation of aromatic compounds with an unsaturated hydrocarbon. More particularly, the present invention is related to a process for producing substituted aromatic compounds by the condensation of unsaturated hydrocarbons with carbocyclic or heterocyclic aromatic ring compounds having attached to a nuclear carbon atom at least one saturated carbon atom to which is attached at least one hydrogen atom.

Alkylation of aromatic compounds with alkyl halides in the presence of various alkylation catalysts is old in the art. However, such processes bring about alkylation of the aromatic nucleus itself with no alkylation of any side chains which may be present on the aromatic compound. More recently it has been found that by non-catalytic means, low molecular weight mono-olefins may be condensed with alkyl aromatic compounds having short alkyl side-chains as substituents. This process has not been found to produce sufficient conversions for commercial utilization. Further, this process is apparently limited to the use of terminally unsaturated olefins as will be noted later.

It is an object of the present invention to provide a process for the production of substituted aromatic compounds. Another object of the present invention is to provide a process for the alkylation of side chains of alkyl aromatic hydrocarbons. More particularly, it is an object of the present invention to provide a process for producing substituted aromatic compounds by the condensation of unsaturated hydrocarbons with carbocyclic or heterocyclic aromatic ring compounds having attached to a nuclear carbon atom at least one saturated carbon atom to which is attached at least one hydrogen atom. Another particular object of the present invention is to provide a process for producing alkyl aromatic hydrocarbons by the condensation of a mono-olefinic hydrocarbon with an alkyl side-chain of an alkyl aromatic hydrocarbon, the alkyl side-chain containing an alpha carbon atom to which is attached at least one hydrogen atom. Additional objects will become apparent from the following description of the invention herein disclosed.

In fulfillment of these and other objects, it has been found that substituted aromatic compounds may be produced in good yields according to the present invention by the condensation of an unsaturated hydrocarbon with a carbocyclic or heterocyclic aromatic ring compound having attached to a nuclear carbon atom, a saturated carbon atom to which is attached at least one hydrogen atom. The condensation reaction is carried out at elevated temperatures and pressures in the presence of modifying agent which comprises a halogen containing compound which at the temperature and pressure of the condensation reaction will form by decomposition or otherwise a halogen halide of the group HCl, HBr and HI. This condensation reaction is illustrated by the following equation:

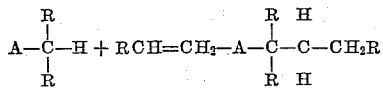

In this equation A represents an aryl radical having either a carbocyclic or heterocyclic nucleus and R represents either hydrogen or an organic radical. By the present process, significantly greater conversions are obtained from the condensation reactions than are obtained by purely non-catalytic thermal means. Further, this process is operable using internally unsaturated hydrocarbons rather than being limited to only terminally unsaturated olefins.

In order to further describe and to demonstrate the present invention, the following examples are presented. These examples are in no way to be construed as limiting to the present invention, however.

*Example I*

Four separate runs were made in which toluene and propylene were concurrently passed into a high temperature, high pressure reactor. The mole ratio of toluene to propylene was 5:1 in all four runs. In one of the runs no modifying agent was used, but in the remaining three runs benzylbromide was present in the reactor. An amount of benzylbromide equivalent to a mole ratio of 0.005:1 of benzylbromide to toluene was used in the latter three runs. The table below presents the conditions and results obtained from all four runs. Run A represents the run in which no modifying agent was used.

| Conditions | Run A | Run B | Run C | Run D |
|---|---|---|---|---|
| Temperature, ° C | 400 | 400 | 375 | 350 |
| Pressure, p.s.i.g | 4,000 | 4,000 | 4,000 | 4,000 |
| Space velocity, g./cc./hr | 3.94 | 4.56 | 4.38 | 4.32 |
| Percent conversion to butylbenzene based on propylene | 1.8 | 36.3 | 43.6 | 17.6 |

By comparison of Run A with the remaining three runs, the advantage of the present invention is readily apparent.

*Example II*

Four separate alkylation reactions were carried out using toluene and 1-hexene in two of the runs and toluene and 2-hexene in the other two. The amount of toluene used in each run was 16.7 millimoles and the amount of olefin used was 1.67 millimoles. In two of the runs, one each with 1-hexene and 2-hexene, benzylbromide was used as a modifying agent. No modifying agent was used in the other two runs. The amount of benzylbromide used in the two runs was approximately 0.084 millimole. The reactions were carried out by placing the reactants in a 4.3 ml. stainless steel tube capable of withstanding pressures of approximately 5000 p.s.i.g. The pressure in these runs was not measured, but may be readily calculated from the temperature and quantity of products in the steel tube. The following table presents the conditions and results of these four runs. Runs A and C are those in which no modifier was used.

| Conditions | Run A | Run B | Run C | Run D |
|---|---|---|---|---|
| Temperature, ° C | 375 | 375 | 375 | 375 |
| Olefin used | 1-hexene | 1-hexene | 2-hexene | 2-hexene |
| Percent conversion of olefin to alkylate | 6.5 | 12.7 | 0.76 | 6.7 |

It should be noted in the above example that almost twice as much alkylate is produced with the alpha-olefin when a modifying agent is used and almost 9 times as much alkylate produced with the internal olefin when a modifying agent is used.

The substituted aromatic compounds with which unsaturated hydrocarbons may be condensed by the process of the present invention are those aromatic compounds having attached to a nuclear carbon atom a saturated carbon atom to which there is attached at least one hydrogen atom. This includes alkyl aromatic hydrocarbons such as alkylbenzenes, alkylnaphalenes and their derivatives, and also includes all compounds containing a stable ring or nucleus such as is present in benzene and which possesses unsaturation in the same sense that benzene does. Therefore, the term "aromatic compound" as used in the present specification and claims includes not only carbocyclic compounds but also heterocyclic compounds having stable nuclei. The carbocyclic compounds may have a benzene, naphthalene, anthracene, etc., nucleus. The heterocyclic aromatic ring compounds may contain both carbocyclic and heterocyclics as is found in indole and carbazole. Also, the aromatic compounds may contain both a benzene nucleus and a cycloalkane nucleus such as is found in tetralin and in indan. The preferred aromatic compounds for use in the present process contain an alkyl side chain attached to a nuclear carbon atom by a saturated carbon atom. By saturated carbon atom is meant one that is bonded by univalent bonds to 4 atoms or groups. The saturated carbon atom must have at least one carbon atom attached thereto. The alkyl side chain may either contain only one carbon atom as the methyl group in toluene or may be one containing a number of carbon atoms either in a straight-chain or a branched-chain relationship. The chain need not be an aliphatic chain. It may be a cycloalkane ring such as in tetralin or indan or as in cyclohexylbenzene. Suitable alkylaromatic hydrocarbons include toluene, ethylbenzene, n-propylbenzene, cumene, iso, normal, and secondary butylbenzene, methylnaphthalene, tetralin, indan, diphenylmethane, cyclopentylbenzene, cyclohexylbenzene, and methyl ethylbenzene. The most preferred aromatic compounds of the present invention are those containing an alkyl side chain or from 1 to 10 carbon atoms, either straight or branched chain. Though any number of substituents may be present in the aromatic nucleus, it would generally be preferred that there be no more than two of such substituents present.

The aromatic ring in the substituted aromatic compounds of the present invention may contain substituents such as alkoxy groups, nitro groups, etc., in addition to containing one or more suitable hydrocarbon substituents.

The unsaturated hydrocarbons which may be condensed with aromatic hydrocarbons according to the process of the present invention comprises organic hydrocarbons containing an ethylenic group and organic hydrocarbons containing an acetylenic group. The ethylenic group of organic hydrocarbons include mono-olefins, di-olefins, tri-olefins, etc., cyclo-olefins and cyclodi-olefins. Several non-limiting examples of unsaturated hydrocarbons suitable for use in the present process are ethylene, propylene, 1-butene, 2-butene, isobutylene, 1-hexene, 2-hexene, 1-octene, 3-octene, 1-decene, 1-dodecene, 2-dodecene, cyclopentene, cyclohexene, methylcyclohexene, cyclopentadiene, methylcyclohexadiene, etc., and acetylenic hydrocarbons such as acetylene, methylacetylene, phenylacetylene and the like. The preferred unsaturated hydrocarbons for the purposes of the present invention are the mono-olefin hydrocarbons of 2 to 15 carbon atoms, either straight or branched chain and having either terminal or internal unsaturation.

The mole ratio of the aromatic compound to the unsaturated hydrocarbon may vary considerably in the present invention. Generally mole ratios of aromatic compound to unsaturated hydrocarbon of 1:1 to 20:1 are used. It is preferred, however, primarily for economical reasons to operate the present invention using a mole ratio of aromatic compound to unsaturated hydrocarbon of 3:1 to 10:1.

The halogen containing modifying agents useful in the present invention may generally be regarded as those compounds in which the halogens chlorine, bromine, iodine or combinations thereof are present. The compounds are those which under the conditions of temperature and pressure within the reaction chamber will by decomposition or otherwise form the hydrogen halides HBr, HCl and HI. This includes elemental chlorine, bromine and iodine as well as compounds containing these elements. The compounds may be either organic or inorganic. In addition to the halogens such other elements as carbon, hydrogen, sulfur, oxygen, or nitrogen may be present in the modifying agent. If the modifying agent is an organic compound it may be saturated or unsaturated, aliphatic or aromatic, straight-chain, branched-chain or cyclic in structure. Halogen containing compounds within the scope of the present invention include the following non-limiting examples.

| Column I | Column II | Column III |
|---|---|---|
| 2-bromopropane | Bromobenzene | Chloroethanoic acid |
| 2-chloropropane | Chlorobenzene | Dibromoethanoic acid |
| 1-iodopropane | m-Dichlorobenzene | Di-iodoethanoic acid |
| 1-bromobutane | o-Dichlorobenzene | a-Chloroacetamide |
| 1-chlorobutane | p-Dichlorobenzene | a-Bromoacetanilide |
| 2-iodobutane | m-Dibromobenzene | Benzoyl chloride |
| 1-bromopentane | o-Dibromobenzene | Benzoyl bromide |
| 2-bromopentane | p-Dibromobenzene | Benzoyl iodide |
| 3-chloropentane | Iodobenzene | Butanoyl chloride |
| 2-iodopentane | o-Iodotoluene | Butanoyl bromide |
| 3-bromohexane | m-Iodotoluene | Butanoyl iodide |
| 2-bromohexane | p-Iodotoluene | 2-chloro-1,4-benzenediol |
| 2-iodohexane | o-Chlorotoluene | 2-bromo-1,4-benzenediol |
| 2-bromo-4-methyl-hexane | m-Chlorotoluene | 1-chloro-4-nitronaphthalene |
| 3-chloroheptane | p-Chlorotoluene | Benzene carbonyl chloride |
| 3-bromoheptane | o-Bromotoluene | Benzene carbonyl bromide |
| 2-iodoheptane | m-Bromotoluene | Succinyl chloride |
| 2-bromo-4-ethyl-hexane | p-Bromotoluene | 4-chloroquinoline |
| 4-bromo octane | 1,3,5-dibromotoluene | Ethanoyl iodide |
| 3-chloro octane | o-Bromo-chloro-benzene | Hexanoyl chloride |
| 2-odo octane | m-Bromo-chloro-benzene | Decanoyl chloride |
| 1-bromononane | p-Bromo-chloro-benzene | 2-bromoethanol |
| 2-bromodecane | 1-chloronaphthalene | Bis-β-chloroethylether |
| 2-chlorodecane | 2-bromonaphthalene | 2-chloroethanol |
| 2-bromo-6-methyl-decane | 1,3-dichloronaphthalene | Chloromethoxy methane |
| 3,3-bromomethyl-decane | 2-bromodiphenyl | Cyclohexylchloride |
| 4-iodoundecane | 2-chlorodiphenyl | Cyclohexylbromide |
| 1-bromododecane | 4-chlorodiphenyl | Carbon tetrachloride |
| Hydrogen chloride | Chlorine gas | 2-chloro-3-hexene |
| Hydrogen bromide | Bromine gas | 2-bromo-2-pentene |
| Hydrogen iodide | Iodine gas | 3-bromo-4-octene |

The halogen containing compounds most useful in the practice of the present invention are those which contain a halogen from the group consisting of bromine, chlorine and iodine and the elements carbon and/or hydrogen. These compounds are the halogen substituted hydrocarbons and hydrogen halides and elemental halogens. There is no critical limit to the molecular weight of the modifying compound other than one of practicality in handling. The preferred modifying agents of the present invention are the mono- and di-halogen substituted hydrocarbons both aliphatic and aromatic of no more than 8 carbon atoms, the hydrogen halides HCl, HBr and HI and the elemental halogens chlorine, bromine and iodine. Though all of the hydrogen halides and organic halides containing bromine, chlorine and iodine are operable in the present invention, it is generally perferred to use compounds containing chlorine or bromine with bromine being preferred over chlorine.

The amount of the modifying agent useful in the present invention is based on the ratio of the hydrogen halides obtainable from the modifying agent to the amount of aromatic compound. Generally the mole ratio between the amount of hydrogen halide present and the amount of aromatic compound in the feed will be maintained within the range of 0.001:1 to 2:1. Usually this ratio will be within the range of 0.005:1 to 0.5:1. It is preferred, however, that the mole ratio of hydrogen halide to aromatic compound be maintained within the range of 0.001:1 to 0.02:1.

The condensation of unsaturated hydrocarbons with the aromatic compounds according to the present invention is carried out at elevated temperatures, usually within the range of 250° C. to the cracking temperature of the particular hydrocarbons in the feed. The preferred temperatures for operating the present invention are, however, within the range of from about 300 to 550° C. With the preferred aromatic compounds, temperatures of 350 to 450° C. are generally preferred.

The process disclosed herein is operated at elevated pressures, generally at a pressure of greater than 1000 p.s.i.g. The upper limit for pressures for carrying out the present invention is limited only by the strength of the reaction vessel. The preferred pressures for operating the present process will generally be above approximately 3000 p.s.i.g. and below 20,000 p.s.i.g.

The apparatus which may be used in carrying out the present invention may be of virtually any design. Of course, it will have to be of such design and materials of construction as to withstand relatively high pressures and temperatures. Its primary requirement is only that it be consistent with good engineering principles.

What is claimed is:

1. A process for producing substituted aromatic compounds which comprises the condensation of an olefin hydrocarbon of 2 to 15 carbon atoms with an aromatic compound having attached to a nuclear carbon atom a saturated carbon atom to which is attached at least one hydrogen atom, said aromatic compound being an alkyl substituted carbocyclic aromatic compound having alkyl substituents of from 1 to 10 carbon atoms, at an elevated temperature and pressure in the presence of a modifying agent which comprises a halogen containing compound which at the elevated temperatures and pressures of the condensation reaction form a hydrogen halide selected from the group consisting of HCl, HBr and HI.

2. The process of claim 1 wherein the mole ratio of aromatic compound to unsaturated hydrocarbon is 1:1 to 20:1.

3. The process of claim 1 wherein the modifying agent is a halogen substituted hydrocarbon in which the halogen is one selected from the group consisting of bromine, chlorine and iodine.

4. The process of claim 1 wherein the modifying agent is a hydrogen halide selected from the group consisting of HBr, HCl and HI.

5. The process of claim 1 wherein the modifying agent is a halogen gas selected from the group consisting of bromine, chlorine and iodine.

6. The process of claim 1 wherein the modifying agent is one containing bromine.

7. The process of claim 1 wherein the modifying agent is one containing chlorine.

8. The process of claim 1 wherein the amount of modifying agent present is sufficient to bring about a mole ratio of 0.001:1 to 2:1 of hydrogen halide formed to aromatic compound.

9. The process of claim 1 wherein the temperature is within the range of approximately 250° C. to the cracking temperature of the hydrocarbons in the feed.

10. The process of claim 1 wherein the pressure is at least 1000 p.s.ig.

References Cited by the Examiner

UNITED STATES PATENTS

| | | | |
|---|---|---|---|
| 2,603,655 | 7/52 | Strain | 260—668 |
| 2,660,610 | 11/53 | Erchak | 260—668 |
| 2,663,724 | 12/53 | Pines et al. | 260—668 |
| 2,849,505 | 8/58 | Schmerling | 260—668 |
| 2,994,725 | 8/61 | Shaw et al. | 260—668 |
| 3,051,766 | 8/62 | Hunter et al. | 260—668 |

FOREIGN PATENTS 896,864   5/62   Great Britain.

OTHER REFERENCES

Royals: "Advanced Organic Chemistry," pp. 147–57 (Prentice Hall) (1954).

WALTER A. MODANCE, *Primary Examiner.*

DUVAL T. McCUTCHEN, NICHOLAS S. RIZZO,
*Examiners.*